Patented May 16, 1933

1,909,557

UNITED STATES PATENT OFFICE

JOHAN FRANÇOIS BARTHOLD VAN HASSELT, OF AMERSFOORT, NETHERLANDS, ASSIGNOR, BY DIRECT AND MESNE ASSIGNMENTS, OF ONE-HALF TO CHEMISCHE INDUSTRIE VAN HASSELT, OF AMERSFOORT, NETHERLANDS, A DUTCH COMPANY OF THE NETHERLANDS, AND ONE-HALF TO ADRIANUS KLEIJN, OF ROTTERDAM, NETHERLANDS

NITROSYL SULPHURIC ACID IN FINELY DIVIDED DRY AND STABILIZED CONDITION AND PROCESS FOR ITS MANUFACTURE

No Drawing. Application filed February 13, 1930, Serial No. 428,243, and in the Netherlands February 16, 1929.

Nitrosyl sulphuric acid is a well known product which is formed as an intermediate product in the manufacture of sulphuric acid in leaden chambers. Until now it has found little technical application, chiefly due to its corrosive properties, the difficulty of storage and transport and its instability when exposed to moisture. Yet it has valuable properties as a bleaching agent, e. g. for flour and as a product from which nitrogen oxides can be developed easily with very simple apparatus.

One object of the present invention is to convert nitrosyl sulphuric acid into a finely divided powdery condition, so that it can be mixed very easily with pulverulent substances, such as flour, in every desired proportion. A further object of the invention is to convert nitrosyl sulphuric acid into a stabilized dry condition and diminishing to a large extent or even completely its corrosive properties, so that it can be easily handled and stored in ordinary containers.

It is well known that the ordinary crystalline nitrosyl sulphuric acid is very hygroscopic and is converted by the water which it attracts into sulphuric acid and nitrogen trioxide so quickly that it is impossible to comminute the crystals to a dry powder under ordinary atmospheric conditions.

It has now been found that a very fine comminution can be obtained if relatively small quantities of adsorbing agents are added to nitrosyl sulphuric acid. Suitable adsorbing agents are charcoal, preferably activated charcoal, bleaching earth, diatomaceous earth, silica gel and other substances containing activated silicic acid and the like.

According to the invention nitrosyl sulphuric acid is mixed with a sufficient quantity of an adsorbing agent to obtain a dry product which, if required, is comminuted to the desired powdery condition. The dry pulverulent product thus obtained is sufficiently stabilized to handle it and to use it for technical purposes. It is still somewhat hygroscopic and when exposed to ordinary air, it slowly absorbs moisture, which decomposes the nitrosyl sulphuric acid into sulphuric acid and nitrogen oxides or nitrous acid. On account of this slow decomposition some corrosion of the apparatus in which it is used cannot be avoided, though it can be stored without difficulty in hermetically closed vessels.

In order to avoid corrosion of the apparatus, in which the powdered nitrosyl sulphuric acid product is used, it has been found desirable to mix the powder with dry pulverulent substances having the capacity of binding sulphuric acid, such as dry calcium phosphate, calcium carbonate, calcium salts of organic acids and even—provided it is not used in excessive quantity—calcium hydroxide. These calcium compounds may be added in such quantity that all of the sulphuric acid which can be liberated by moisture is converted into calcium sulphate. The added dry pulverulent substances do not react with nitrosyl sulphuric acid in the absence of moisture or at least so slowly that the mixture remains practically unchanged in storage in hermetically sealed vessels. When the product is used e. g. for bleaching flour, the sulphuric acid liberated is bound by the added substances and nitrogen trioxide is liberated by the action of the moisture in the flour and bleaches the flour. In the absence of moisture there is no evolution of nitrogen tri-oxide.

*Example 1.*—1 part by weight of nitrosyl sulphuric acid is melted, mixed and comminuted with 1 part by weight of the activated charcoal known by the trade name of "Norit". A quite dry, fine powder is obtained.

*Example 2.*—1 part by weight of a finely divided active silicic acid is mixed with 4 parts by weight of nitrosyl sulphuric acid. A pulverulent dry white powder is obtained with great activity. The powder can be stored in closed vessels without any decomposition.

*Example 3.*—A comminuted mixture is obtained of the following composition:

| | Parts by weight |
|---|---|
| Nitrosyl sulphuric acid | 22 |
| Silica gel | 8 |
| Gypsum | 30 |
| Chalk | 20 |
| Slaked lime | 10 |

In dry condition these substances do not react with each other, but under the action of moisture nitrogen tri-oxide, carbon di-oxide and gypsum are formed.

*Example 4*

| | Parts by weight |
|---|---|
| Double compound $2N_2O_3 5SO_3$ | 20 |
| Silica gel | 8 |
| Ammonium sulphate | 15 |
| Magnesium carbonate | 15 |
| Tri-calcium phosphate | 20 |
| Magnesium oxide | 10 |

If the product is mixed with flour, the moisture from the flour causes the desired evolution of $N_2O_3$, but if the product is only exposed to air, the small quantities of water, which are absorbed from the air, only cause a small decomposition but never cause the formation of free sulphuric acid, so that no corrosive action takes place. The small quantity of $N_2O_3$ which is formed thereby remains adsorbed or chemically bound in the product.

What I claim is:—

1. A process for the manufacture of a finely divided solid bleaching agent for cereal milling products, consisting in mixing and comminuting solid nitrosyl sulphuric acid with an adsorbing agent.

2. A process for the manufacture of a finely divided solid bleaching agent for cereal milling products, consisting in comminuting solid nitrosyl sulphuric acid in the presence of active silicic acid.

3. A process according to claim 2, consisting in comminuting solid nitrosyl sulphuric acid in the presence of silica gel.

4. A process for the manufacture of a finely divided solid bleaching agent for cereal milling products, consisting in comminuting solid nitrosyl sulphuric acid with an adsorbing agent and mixing the obtained product with a finely divided substance capable of neutralizing sulphuric acid.

5. A process for the manufacture of a finely divided solid bleaching agent for cereal milling products, consisting in comminuting solid nitrosyl sulphuric acid with an adsorbing agent and mixing the obtained product with an alkaline earth metal compound capable of neutralizing sulphuric acid.

6. A process for the manufacture of a finely divided solid bleaching agent for cereal milling products, consisting in comminuting solid nitrosyl sulphuric acid with an adsorbing agent and mixing the product with a calcium compound capable of forming non-corrosive products with sulphuric acid.

7. A process for the manufacture of a finely divided solid bleaching agent for cereal milling products, consisting in comminuting solid nitrosyl sulphuric acid with an adsorbing agent and mixing the product with a poorly soluble calcium compound capable of forming a non-corrosive product with sulphuric acid.

8. A process for the manufacture of a finely divided solid bleaching agent for cereal milling products, consisting in comminuting solid nitrosyl sulphuric acid in the presence of active silicic acid and a calcium compound capable of forming non-corrosive products with sulphuric acid.

9. A bleaching agent for cereal milling products, consisting of a mixture of finely divided solid nitrosyl sulphuric acid with an adsorbing agent.

10. A bleaching agent for cereal milling products, consisting of a finely divided solid nitrosyl sulphuric acid, active silicic acid and a substance capable of neutralizing sulphuric acid.

11. A bleaching agent for cereal milling products, consisting in a mixture of finely divided solid nitrosyl sulphuric acid, active silicic acid and a calcium compound capable of forming non-corrosive products with sulphuric acid.

In testimony whereof I affix my signature.

JOHAN FRANÇOIS BARTHOLD van HASSELT.